(12) United States Patent
Subramanya et al.

(10) Patent No.: US 9,436,755 B1
(45) Date of Patent: Sep. 6, 2016

(54) DETERMINING AND SCORING TASK INDICATIONS

(71) Applicant: Google Inc., Mountain View, CA (US)

(72) Inventors: Amarnag Subramanya, Sunnyvale, CA (US); Edgar Gonzalez Pellicer, San Francisco, CA (US); Shalini Agarwal, San Francisco, CA (US); Dave Orr, Los Altos, CA (US)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 14/164,232

(22) Filed: Jan. 26, 2014

(51) Int. Cl.
*G06F 17/30* (2006.01)
*G06F 17/28* (2006.01)

(52) U.S. Cl.
CPC ......... *G06F 17/30598* (2013.01); *G06F 17/28* (2013.01); *G06F 17/3064* (2013.01); *G06F 17/30684* (2013.01)

(58) Field of Classification Search
CPC ........... G06F 17/277; G06F 17/30684; G06F 17/3064; G06Q 10/107
USPC .......................... 704/257; 707/737–738, 750
See application file for complete search history.

(56) References Cited

U.S. PATENT DOCUMENTS

| | | | |
|---|---|---|---|
| 5,603,054 A | 2/1997 | Theimer et al. | |
| 6,115,709 A | 9/2000 | Gilmour et al. | |
| 6,438,543 B1 | 8/2002 | Kazi et al. | |
| 6,632,251 B1 * | 10/2003 | Rutten | G06F 17/2809 715/205 |
| 6,842,877 B2 | 1/2005 | Robarts et al. | |
| 7,496,500 B2 | 2/2009 | Reed et al. | |
| 7,702,631 B1 | 4/2010 | Basu et al. | |
| 7,809,548 B2 * | 10/2010 | Mihalcea | G06F 17/277 715/200 |
| 7,813,916 B2 | 10/2010 | Bean | |
| 8,046,226 B2 | 10/2011 | Soble et al. | |
| 8,055,707 B2 | 11/2011 | Desai et al. | |
| 8,108,206 B2 | 1/2012 | Hufnagel et al. | |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | Mcgann et al. | |
| 8,560,487 B2 | 10/2013 | Jhoney et al. | |
| 8,599,801 B2 | 12/2013 | Baio et al. | |
| 8,630,995 B2 * | 1/2014 | Bachert | G06F 19/324 707/709 |
| 8,768,954 B2 * | 7/2014 | Pieper | G06F 17/3089 707/769 |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Marc Filipczyk
(74) *Attorney, Agent, or Firm* — Middleton Reutlinger

(57) ABSTRACT

Methods and apparatus related to determining and scoring task indications. For example, methods and apparatus may determine a plurality of interrogative sentences in a plurality of messages, determine starting n-grams of the interrogative sentences, determine task indications based on the starting n-grams, and determine task association scores for the task indications. Each task indication may be determined based on a set of one or more starting n-grams that share similarities. One or more individuals and/or applications may assign one or more task association measures to a task indication based on likelihood that the task indication is associated with a task request. The task association score for the task indication may be determined based on the task association measures that are assigned to the task indication.

23 Claims, 7 Drawing Sheets

(56) References Cited

U.S. PATENT DOCUMENTS

| | | | |
|---|---|---|---|
| 8,819,001 B1* | 8/2014 | Zhang | G06F 17/30687 707/708 |
| 2009/0307212 A1 | 12/2009 | Ramot et al. | |
| 2012/0005221 A1 | 1/2012 | Ickman et al. | |
| 2012/0030588 A1 | 2/2012 | Sinha | |
| 2012/0150532 A1 | 6/2012 | Mirowski et al. | |
| 2012/0239761 A1 | 9/2012 | Linner et al. | |
| 2012/0317499 A1 | 12/2012 | Shen | |
| 2012/0331036 A1 | 12/2012 | Duan et al. | |
| 2013/0073662 A1 | 3/2013 | Meunier et al. | |
| 2013/0159270 A1 | 6/2013 | Urmy et al. | |
| 2013/0290436 A1 | 10/2013 | Martin et al. | |
| 2013/0297551 A1 | 11/2013 | Smith et al. | |
| 2014/0297284 A1* | 10/2014 | Gruber | G10L 15/18 704/257 |
| 2014/0372433 A1* | 12/2014 | Dougherty | G06F 17/30014 707/736 |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

* cited by examiner

| | | | |
|---|---|---|---|
| 200A — Would you go to the store tonight? | 200B — Would | Would you | Would you go |
| 205A — Could you go to the store after work? | 205B — Could | Could you | Could you go |
| 210A — Can you meet at 7 at the restaurant? | 210B — Can | Can you | Can you meet |
| 215A — Can you call me at 555-555-5555 by the end of the day? | 215B — Can | Can you | Can you call |
| 220A — Will you please call me at 222-222-2222? | 220B — Will | Will you | Will you please |
| 225A — Could you please go to the store? | 225B — Could | Could you | Could you please |
| 230A — Will Bob be there? | 230B — Will | Will <name> | Will <name> be |

| | |
|---|---|
| 200C — Could you | 2 — 205C |
| 210C — Will <name> be | 1 — 215C |
| 220C — Can you | 2 — 225C |
| 230C — <Could/Will> you please | 2 — 235C |

FIG. 2C

DETERMINING AND SCORING TASK INDICATIONS

BACKGROUND

A user may utilize one or more systems to create and/or receive messages related to one or more tasks. The sender of a message may provide, in natural language in the message, a request to one or more recipients to perform a task.

SUMMARY

This specification is generally directed to methods and apparatus related to determining task indications from starting n-grams in a plurality of messages and determining a task association score for each of one or more of the task indications. The starting n-grams may be determined from interrogative sentences that are identified in the messages. The task association score for a task indication generally indicates the likelihood that the task indication is indicative of a task request. The task association score for a given task indication may be based on one or more task association measures that are assigned to the given task indication. In some implementations, a group of task indications may be determined based on a count of starting n-grams that conform to each of the task indications of the group and the group may be provided to a measurement determination system. The measurement determination system may include an interface to provide one or more entities with the task indications and the entities may assign one or more task association measures to each task indication. Each task association measure is indicative of likelihood that a respective task indication is associated with one or more task requests. A task association score may be determined for each task indication based on the one or more task association measures that are assigned to the task indication.

Some implementations are directed to identifying a plurality of messages, determining a plurality of interrogative sentences from the messages, determining one or more starting n-grams from each of the interrogative sentences, determining a group of task indications that are each indicative of one or more of the starting n-grams, providing the group of task indications for association with task association measures, and utilizing the one or more task association measures of each task indication to determine a task association score for each task indication. The task association measures may be determined and assigned to the task indications by one or more individuals and/or by one or more task association applications.

In some implementations, a method is provided that includes: identifying a plurality of messages from one or more databases; determining a plurality of interrogative sentences from the messages; determining starting n-grams from the interrogative sentences; determining a group of task indications, wherein each of the task indications of the group is based on a set of one or more of the starting n-grams, and wherein determining to include a given task indication of the task indications in the group is based on a count of the starting n-grams that conform to the given task indication; providing the group of the task indications; receiving, in response to providing the group of the task indications, one or more task association measures for each of the task indications of the group, wherein a given task association measure for a given task indication is indicative of likelihood that the given task indication is associated with a task request; and determining a task association score for each of the task indications of the group, wherein the task association score for the given task indication is based on the one or more task association measures received for the given task indication.

This method and other implementations of technology disclosed herein may each optionally include one or more of the following features.

Providing the group of the task indications may further include providing the group of the task indications, independent of other information of the interrogative sentences, to one or more computing devices for assignment of the task association measures by one or more individuals.

Determining the starting n-gram for a given interrogative sentence of the interrogative sentences may include identifying a verb in the given interrogative sentence and determining the starting n-gram based on one or more n-grams that occur before the verb in the given interrogative sentence. The starting n-gram for the given interrogative sentence may include the verb and one or more of the n-grams that occur before the verb in the given interrogative sentence.

Determining the plurality of interrogative sentences may include determining the interrogative sentences based on at least one n-gram of the interrogative sentences, wherein the at least one n-gram is indicative of an interrogative sentence. The at least one n-gram may include a punctuation mark. The punctuation mark may be a question mark.

Each of the task association measures may be a binary value.

The method may further include associating, in a database, one or more of the task indications with a corresponding said task association score.

The method may further include: determining the task association score for the given task indication satisfies a threshold task association score indicative of a likely task request; and storing, in a database, the given task indication as a likely task indication based on determining the task association score for the given task indication satisfies the threshold task association score.

The method may further include: determining a subset of the task indications with corresponding said task association scores that satisfy a threshold task association score indicative of a likely task request; and storing the subset of the task indications as likely task indications. The storing the subset of the task indications as likely task indications may include storing, in a database, each of the task indications of the subset and associated said task association scores.

Identifying the plurality of messages may include identifying the messages based on senders of the messages. Identifying the plurality of messages based on the senders may include restricting the messages to those indicated as having a sender who is an individual.

Identifying the plurality of messages may include identifying the messages based on recipients of the messages.

Each of the starting n-grams may be only a portion of a respective one of the interrogative sentences.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine a task association score for each task indication of a group of task indications. Each determined task association score may be based on one or more task association measures. The group of task indications may be determined based on a count of starting n-grams that conform to each of the task indications. The group of task indications may be provided to one or more measurement determination systems that may provide the task indications to one or more individuals and/or applications. The individuals and/or applications may determine task association measures and the measurement determination system may provide the task association measures to one or more components, which may utilize the task association measure to determine a task association score for each task indication. One or more of the determined task indications, and optionally the associated task association scores, may be stored in a database and utilized to identify one or more terms in subsequent messages that are indicative of a task request.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A is a set of example interrogative sentences.

FIG. 2B is a set of example starting n-grams for the interrogative sentences of FIG. 2A.

FIG. 2C is a set of task indications that may be determined from the starting n-grams of FIG. 2B.

DETAILED DESCRIPTION

Figure 1:
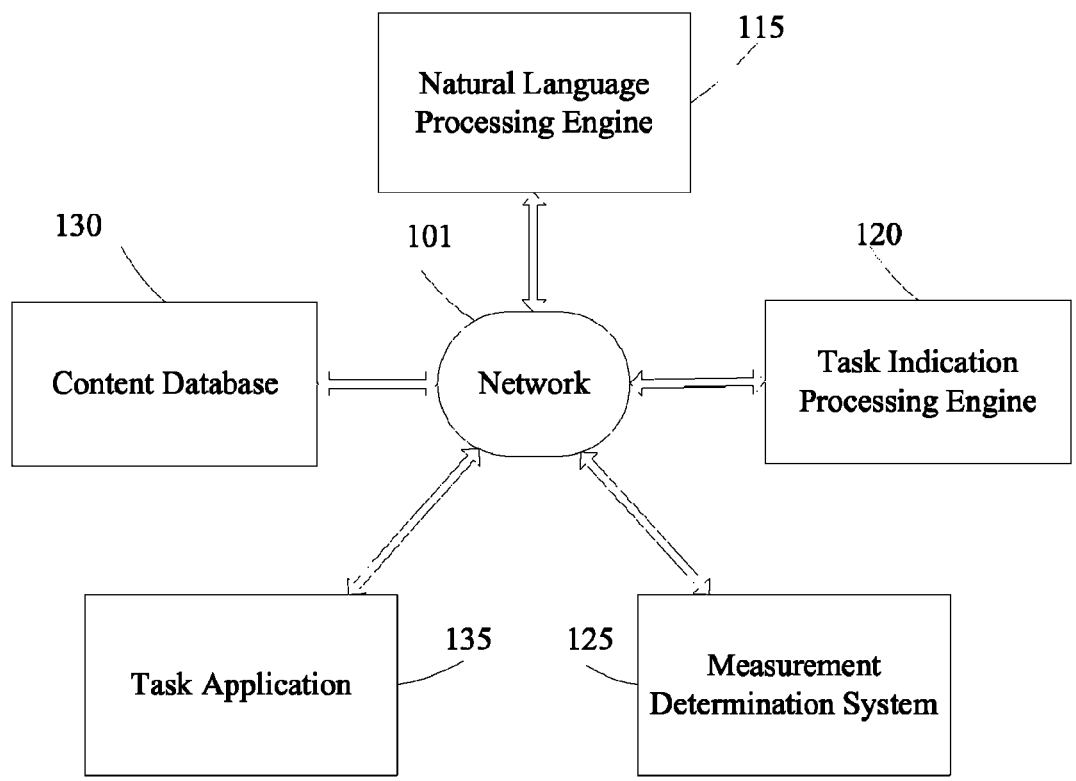
FIG. 1 is a block diagram of an example environment in which a method of determining task association scores for task indications may be implemented.

A user may create a message, include a task request in the message, and provide the message to one or more recipients of the message. For example, a user may create a message that includes the sentence "Will you make reservations tomorrow?" and provide the message to a recipient. Because the sentence is written in natural language, determining that the sentence is related to a task and/or is a task request may include determining that one or more terms of the sentence are indicative of a task request.

Techniques described herein determine one or more task indications that may be utilized to determine a task request in one or more subsequent messages based on one or more terms of the subsequent messages. For example, a task indication of "Will you" may be determined as an n-gram that is indicative of a task request based on techniques described herein. The task indication "Will you" may be utilized to determine that the subsequent sentence "Will you make reservations tomorrow?" is indicative of a task request based at least in part on determining that the sentence includes the terms of the task indication "Will you."

A task indication may be determined based on starting n-grams determined from sentences that are potentially indicative of task requests. In some implementations, starting n-grams may be determined from interrogative sentences of messages. An interrogative sentence is a statement in a message that expresses or includes a question from the sender of the message to one or more recipients of the message. In some instances, an interrogative sentence ends with a question mark. In some instances, an interrogative sentence includes one or more terms that are indicative of a request, such as "will," "could," and/or "would."

As described, in some implementations, one or more task indications may be determined based on one or more starting n-grams of interrogative sentences. The task indications may each be associated with a set of starting n-grams from multiple interrogative sentences. A group of the task indications may be determined based on a count of starting n-grams that conform to each task indication in the group. For example, the n task indications that are associated with the greatest number of conforming starting n-grams may be included in the group of task indications. For example, the 500 task indications that are associated with the greatest number of conforming starting n-grams may be included in the group.

The group of task indications may be provided to one or more individuals to determine, based only on the task indications and not on additional information from the sentences and/or messages that were utilized to determine the task indications, whether the task indications are associated with task requests. An individual may assign a task association measure to a task indication that is indicative of the likelihood that the task indication is associated with one or more task requests. For example, a task association measure for a task indication may be a binary measure of likelihood that the task indication is associated with a task request, such as "yes" and "no." Also, for example, a task association measure may be a value from 0 to 100 that is indicative of likelihood that a task indication is associated with a task request (e.g., 0 is the least likelihood and 100 is the greatest likelihood). The task association measures may be utilized to determine an overall task association score for each of the task indications of the provided task indication group. For example, the task association score for a given task indication may be based on a sum, average, median, and/or other combination of task association measures associated with the given task indication. Task indications and, optionally associated task association scores, may be stored in a database for later utilization by one or more applications. For example, only those task indications having a task association score satisfying a threshold may be stored in a database for later utilization.

A task indication, and optionally an associated task association score, may be utilized by one or more applications to determine whether a subsequent message includes a task request. For example, a task application may utilize the terms of a task indication that has been determined to be indicative of a likely task request to identify one or more terms in a sentence of a message that includes the terms of the task indication. For example, the sentence "Could you go to the store?" may be identified in a message and the sentence may be determined to be related to the task indication "Could you" based on the sentence beginning with the terms of the task indication. Also, for example, an application may utilize one or more task indications determined to be indicative of likely task requests as all or part of a rule in determining if a task request is present in a message based on a rules-based grammar. For example, a task application may utilize a task indication of "Could you" as all or part of a rule of a rules-based grammar to determine whether an identified sentence in a message is a task request.

Referring to FIG. 1, a block diagram is provided of an example environment in which a method of determining task association scores for task indications may be implemented. The environment includes a natural language processing engine 115, a task indication processing engine 120, a measurement determination system 125, a content database 130, and a task application 135. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 7:
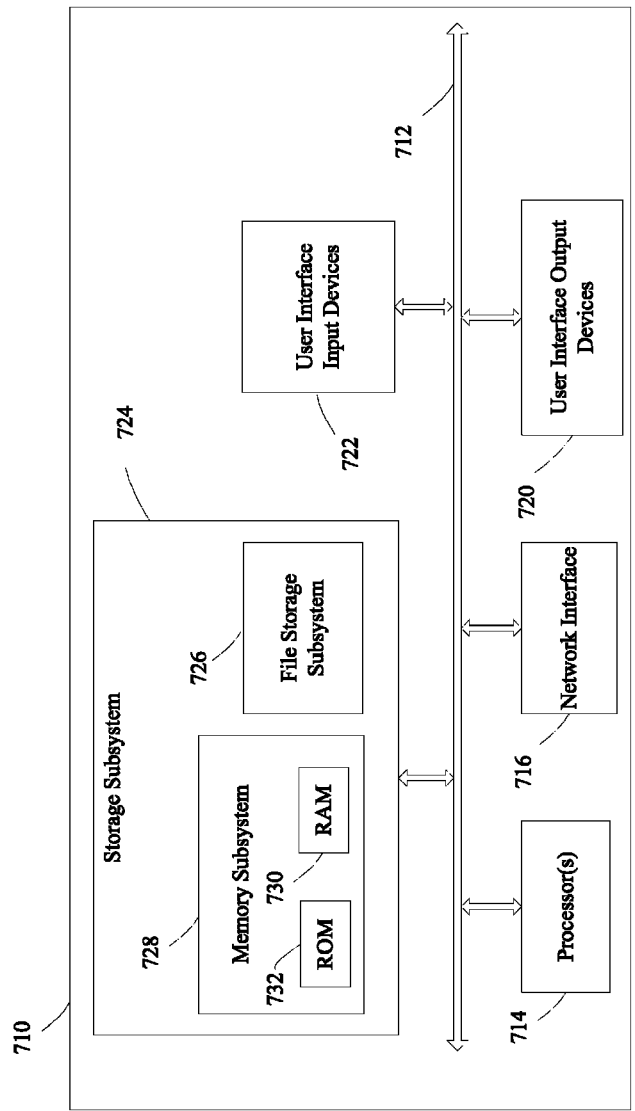
FIG. 7 illustrates a block diagram of an example computer system.

The natural language processing engine 115, task indication processing engine 120, measurement determination system 125, content database 130, task application 135, and/or one or more additional components of the example environment of FIG. 1 may each include memory for storage of data and software applications, a processor for accessing data and executing applications, and components that facilitate communication over a network. In some implementations, natural language processing engine 115, task indication processing engine 120, measurement determination system 125, task application 135, and/or content database 130 may include hardware that shares one or more characteristics with the example computer system that is illustrated in FIG. 7. The operations performed by components of the example environment may be distributed across multiple computer systems. For example, natural language processing engine 115, task indication processing engine 120, measurement determination system 125, content database 130, and/or task application 135 may be computer programs running on one or more computers in one or more locations that are coupled to each other through a network, such as communication network 101.

Content database 130 may be utilized by one or more components to store and/or access data (e.g., messages, starting n-grams, task indications, task association measures, and/or task association scores). In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

In some implementations, content database 130 may include information associated with one or more messages that have been sent, composed, and/or received by one or more users. In some implementations, messages and/or information associated with messages that are stored in content database 130 may optionally be stored so that personal information is inaccessible. For example, identifiers of the sender and/or recipients of a message may be removed from a message before the message is stored in content database 130. Also, for example, identifying information in messages that are stored in content database 130 may be replaced with placeholders for the information, such as replacing a telephone number in a message with an indication that a telephone number was present in the original message but has been removed from the message (e.g., replacing "my phone number is 555-5555" with "my phone number is <phone number>").

Natural language processing engine 115 may include one or more modules to identify and/or parse one or more sentences or other segments of messages and/or otherwise process the sentences or other segments. For example, natural language processing engine 115 may identify sentences in a message based on punctuation, tag one or more terms of the message based on parts of speech, and/or tag one or more terms of the message based on one or more entities that are associated with the terms. For example, natural language processing engine 115 may determine an interrogative sentence and/or classify one or more sentences in a message as interrogative sentences by identifying punctuation in the message, such as sentences that end with a question mark. Also, for example, natural language processing engine 115 may determine and/or classify one or more sentences based on one or more terms that are associated with a "verb" part of speech and associate the terms with the "verb" part of speech.

Natural language processing engine 115 may identify a group of messages that may be utilized to determine task indications. Messages may include, for example, emails, text messages, instant messages, etc. In some implementations, natural language processing engine 115 may identify messages in content database 130. The messages may be messages that were sent by one or more senders and received by one or more recipients. In some implementations, natural language processing engine 115 may identify messages with identifying information removed and/or may not access and/or utilize certain identifying information in identifying messages. For example, natural language processing engine 115 may identify one or more emails in content database 130 that do not include the email address of the senders and/or recipients of the messages and/or that do not include potentially identifying information in the body of the messages. For example, natural language processing engine 115 may identify one or more messages with addresses, phone numbers, names, and/or other identifying information removed and/or replaced with an identifier of the replaced information, such as a message with an address of "123 Main Street" replaced with "<address>."

In some implementations, natural language processing engine 115 may identify, from a superset of messages, a subset group of messages to utilize for determining task indications. For example, natural language processing engine 115 may identify a group of messages and refine the group to exclude one or more of the messages based on, for example, the senders of the messages, the recipients of the messages, and/or other content of the messages.

In some implementations, natural language processing engine 115 may identify a group of messages to utilize for determining task indications based on the senders and/or recipients of the messages. For example, natural language processing engine 115 may identify only messages that are indicative of individual-to-individual messages. Also, for example, natural language processing engine 115 may exclude messages that are indicative of being sent from a business entity. In some implementations, natural language processing engine 115 may determine whether a message is to/from an individual or a business entity based on, for example, the domain name of an email address of a sender and/or recipient of the message. For example, natural language processing engine 115 may identify messages that originate from email addresses that are indicative of personal email addresses and not identify messages that originate from email addresses with a business domain. In some implementations, one or more lists of domain names and/or e-mail addresses may be utilized to identify personal e-mail addresses and/or business e-mail addresses. Also, for example, natural language processing engine 115 may determine a group of messages based on the recipients of the messages. For example, natural language processing engine 115 may identify only messages that are sent to a single recipient that is an individual or natural language processing engine 115 may identify only messages that included multiple recipients that are individuals.

In some implementations, natural language processing engine 115 may identify a group of messages to utilize for determining task indications based on other content of the messages. For example, natural language processing engine 115 may exclude messages from the group that have subject lines that are indicative of an advertisement, such as "20% sale", based on identifying that one or more terms in the subject line are indicative of a mass-mailed message and/or are not likely to include task requests. Also, for example, natural language processing engine 115 may exclude messages from the group that include content indicating they are advertisements, daily e-mails, and/or electronic bills. Also, for example, natural language processing engine 115 may include messages in the group that include a subject line that is indicative of an individual-to-individual message. Additional and/or alternative techniques may be utilized to determine a group of messages to utilize for determining task indications. In some implementations, content database 130 may include only messages that have been previously filtered to remove messages based on one or more criteria such as those described herein, and natural language processing engine 115 may have access only to the filtered messages.

Natural language processing engine 115 may determine one or more interrogative sentences from the identified group of messages. Generally, an interrogative sentence is a segment of a message that is indicative of a question from the sender of the message to a recipient of the message. In some implementations, an interrogative sentence includes a question from the sender to one or more recipients and/or an interrogative sentence may include a statement that may be indicative of a request by the sender of the message to one or more of the recipients. In some implementations, natural language processing engine 115 may identify an interrogative sentence based on the sentence ending in a question mark. For example, natural language processing engine 115 may identify "Could you go to the store?" as an interrogative sentence based on identifying that the sentence ends in a question mark. In some implementations, natural language processing engine 115 may utilize additional or alternative methods to identify interrogative sentences in a message. For example, natural language processing engine 115 may identify one or more terms (e.g., "Would you," "Can you," and/or "Will you") in a sentence and determine that the sentence is an interrogative sentence based at least in part on the presence of the identified term or terms.

Referring to FIG. 2A, a set of example interrogative sentences is provided. The interrogative sentences may be determined by natural language processing engine 115 from one or more messages that were identified from content database 130. In some implementations, one or more of the interrogative sentences and/or the messages that include the interrogative sentences may have identifying information removed and/or replaced with a generic placeholder that describes the replaced information. For example, sentence 215A may instead have the phone number "555-555-5555" replaced with an indication that the sentence includes a phone number without providing natural language processing engine 115 with the phone number that was originally present in the sentence. Natural language processing engine 115 may determine that sentences 200A, 205A, 210A, 215A, 220A, 225A, and 230A are interrogative sentences based on the sentences ending in a question mark.

In some implementations, natural language processing engine 115 may determine only interrogative sentences that conform to certain length requirements, structure requirements, and/or other requirement(s). For example, in some implementations natural language processing engine 115 may determine only interrogative sentences that are at least n terms in length, that include at least one verb, and/or that include at least n terms before a verb.

Natural language processing engine 115 may determine one or more starting n-grams from the determined interrogative sentences. A starting n-gram may include one or more consecutive terms that occur at the start of an interrogative sentence. In some implementations, determined starting n-grams may include n-grams that are less than or equal to a determined length and/or within a range of lengths. For example, natural language processing engine 115 may determine starting n-grams that include the first four terms of interrogative sentences. In some implementations, determined starting n-grams may be less than or equal to a determined length. For example, natural language processing engine 115 may determine a starting 1-gram, 2-gram, 3-gram, and 4-gram for each determined interrogative sentence. Also, for example, natural language processing engine 115 may determine a starting n-gram that includes the first four terms of an interrogative sentence that occur before the verb of the sentence unless less than four terms occur in the interrogative sentence before the verb, in which case natural language processing engine 115 may determine a starting n-gram that includes all of the terms before the verb. Also, for example, natural language processing engine 115 may determine a starting n-gram that includes the first two terms of an interrogative sentence that occur before the verb of the sentence unless less than two terms occur in the interrogative sentence before the verb, in which case natural language processing engine 115 may determine a starting n-gram that includes all of the terms before the verb (if any).

In some implementations, natural language processing engine 115 may determine one or more starting n-grams based on one or more identified terms in a sentence. For example, natural language processing engine 115 may determine a starting n-gram for an interrogative sentence that includes one or more terms that occur in the interrogative sentence before an identified verb of the sentence. Also, for example, natural language processing engine 115 may determine a starting n-gram of an interrogative sentence that includes an identified verb of a sentence and one or more terms that occur before the verb and/or that occur after the identified verb (i.e., a starting n-gram that includes the verb of the interrogative sentence and one or more n-grams before and/or after the verb).

In some implementations, natural language processing engine 115 may determine multiple n-grams from an interrogative sentence. For example, natural language processing engine 115 may identify all starting n-grams in an interrogative sentence that include four or less terms (i.e., starting n-grams of length 1, 2, 3, and 4). In some implementations, natural language processing engine 115 may determine starting n-grams that are within a range of lengths, such as starting n-grams from interrogative sentences that are 2-grams, 3-grams, and 4-grams.

Referring to FIG. 2B, a set of example starting n-grams for the interrogative sentences of FIG. 2A is provided. For example, starting n-grams 200B ("Would," "Would you," "Would you go") are starting n-grams that are determined based on sentence 200A. The starting n-grams of FIG. 2B include starting 1-grams, 2-grams, and 3-grams from the interrogative sentences of FIG. 2A. Although particular techniques for determining starting n-grams are described with respect to FIG. 2B, additional and/or alternative techniques may be utilized. For example, in some implementations the first n terms that occur before the verb of a sentence may be utilized. Also, for example, in some implementations, determined starting n-grams 200B, 205B, 210B, 215B, 220B, 225B, and 230B may include n-grams of greater lengths, such as 4-grams and/or 5-grams of the interrogative sentences of FIG. 2A.

In some implementations, natural language processing engine 115 may determine one or more starting n-grams that are canonicalizations of the corresponding portion of the interrogative sentence. For example, natural language processing engine 115 may determine a starting n-gram of "make reservation" for an interrogative sentence that includes the n-gram "make reservations." Also, for example, natural language processing engine 115 may remove one or more stop words, such as "the" and "and." For example, natural language processing engine 115 may determine a starting n-gram of "Call restaurant" from an interrogative sentence that includes the n-gram "Call the restaurant." In some implementations, additional or alternative canonicalizations may be utilized. For example, natural language processing engine 115 may identify an optional term, such as "please," in a starting n-gram and remove the optional term from the starting n-gram before providing the starting n-gram to task indication processing engine 120 (e.g., a starting n-gram of "Please call me" may be provided to task indication processing engine 120 as "call me").

Task indication processing engine 120 may determine a plurality of task indications based on the starting n-grams that were determined by natural language processing engine 115. In some implementations, multiple starting n-grams may be utilized to determine a task indication based on similarity between the starting n-grams. For example, referring to FIG. 2B, task indication processing engine 120 may utilize starting 3-grams 220B and 225B ("Will you please" and "Could you please") to determine a task indication based on similarity between the terms of the starting 3-grams 220B and 225B, such as a task indication 230C of "<Could/Will> you please." In some implementations, task indication processing engine 120 may determine a task indication that is indicative of multiple starting n-grams that are the same. For example, natural language processing engine 115 may determine one or more starting n-grams of "Could you" (205B, 225B) and task indication processing engine 120 may determine that "Could you" is a task indication 200C based on the starting n-grams occurring multiple times in the set of interrogative sentences.

In some implementations, task indication processing engine 120 may determine one or more optional terms that occur in one or more starting n-grams and remove the optional term and/or include a placeholder in the determined task indication that indicates that starting n-grams that conform to the task indication may include the optional terms. For example, a task indication of "[Please] call me" may be determined based on the starting n-grams of "Call me" and "Please call me." Also, for example, "Please" may not be included in the determined task indication and task indication processing engine 120 may determine a task indication of "Call me." In some implementations, task indication processing engine 120 may remove identifying information and/or generalize one or more terms that were included in starting n-grams. For example, task indication processing engine 120 may remove terms from task indications that are indicative of phone numbers, names, email addresses, and/or addresses. Also, for example, task indication processing engine 120 may determine a task indication that includes a marker that indicates the starting n-grams that were utilized to determine the task indication included identifying information without including the identifying information in the task indication. For example, task indication 210C includes a placeholder "<name>," which may be a marker that the starting n-grams that conform to the task indication include a name, without including the name in the task indication.

Referring to FIG. 2C, a set of task indications that may be determined by task indication processing engine 120 from the starting n-grams of FIG. 2B are illustrated. Task indication 200C is based on the starting 2-grams 205B and 225B. Task indication 210C includes a placeholder for a name without including the name in the task indication. Task indication 220C may be determined based on the two instances of "Can you" in the set of starting n-grams of FIG. 2B (i.e., 210B and 215B). Task indication processing engine 120 may determine task indication 230C based on identifying instances of "Could you please" and "Will you please" in the set of starting n-grams of FIG. 2B (i.e., 220B and 225B) and determining that the terms "Could" and "Will" may be interchangeable terms. Other task indications may be determined in addition to the task indications that are provided in FIG. 2C and the provided task indications are for illustrative purposes only.

Task indication processing engine 120 may determine a group of task indications to provide to the measurement determination system 125 for assignment of task association measures. In some implementations, the task indication processing engine 120 may determine the group of task indications based on a count of the starting n-grams that conform to each determined task indication and include task indications in the group based on the count of the conforming starting n-grams. For example, only the n task indications that are associated with the greatest number of conforming starting n-grams may be included in the group of task indications. For example, the 500 task indications that are associated with the greatest number of conforming starting n-grams may be included in the group. Also, for example, only task indications that are associated with a threshold number of starting n-grams may be included in the group. For example, referring to FIG. 2C, each of the determined task indications (200C, 210C, 220C, 230C) is associated with a count (205C, 215C, 225C, 235C) of starting n-grams that conform to the corresponding task indication. For example, task indication 200C includes a count 205C of "2" based on identifying that starting 2-grams 205B and 225B both conform to the task indication "Could you." In some implementations, determining a count of conforming n-grams for a task indication may include determining a frequency of starting n-grams that conform to a task indication. For example, task indication processing engine 120 may determine a frequency of "1/7," "0.142," and/or "14.2%" for task indication 220C based on identifying one occurrence of task indication 220C in a set of seven starting 2-grams.

As described, task indication processing engine 120 may determine a group of the task indications to provide to measurement determination system 125 based on the count of starting n-grams that conform to the task indications. For example, referring to FIG. 2C, task indication processing engine 120 may include all of the task indications of FIG. 2C except task indication 210C in a task indication group based on task indication 210C appearing only once in the set of starting n-grams of FIG. 2B.

In some implementations, task indication processing engine 120 may provide the determined group of task indications to measurement determination system 125. In some implementations, measurement determination system 125 may include one or more computing devices that may be utilized by one or more entities to assign one or more task association measures to each of the task indications of the group. The one or more entities may determine, for each of the task indications of the group, one or more task association measures that are each indicative of a likelihood that the task indication is indicative of one or more task requests. In some implementations, measurement determination system 125 may present the group of task indications to one or more individuals that may determine, for each of the task indications, the likelihood of the task indication being associated with one or more task requests based on inspection of the task indication. As described herein, in some implementations each task indication may be presented to an individual independent of other information of the interrogative sentences and/or messages from which n-grams corresponding to the task indication were determined. In some implementations, measurement determination system 125 may additionally and/or alternatively include one or more applications that may determine the likelihood that a task indication is associated with one or more task requests.

In some implementations, the one or more individuals and/or the one or more applications may determine the likelihood that a task indication is indicative of a task request and assign a value to the task indication that is indicative of the determined likelihood. For example, an individual and/or application may determine a binary measure of the likelihood that a task indication is indicative of a task request (e.g., 1 for yes, 0 for no; "true" for yes, "false" for no). In some implementations, an individual and/or application may determine a non-binary measure that is indicative of the likelihood that the task indication is indicative of a task request. For example, an individual and/or an application may determine a task association measure from 0 to 10 that is indicative of likelihood that a task indication is indicative of a task request. Also, for example, an individual and/or application may determine a task association measure from 0 to 1 that is indicative of likelihood that a task indication is indicative of a task request.

Figure 3:
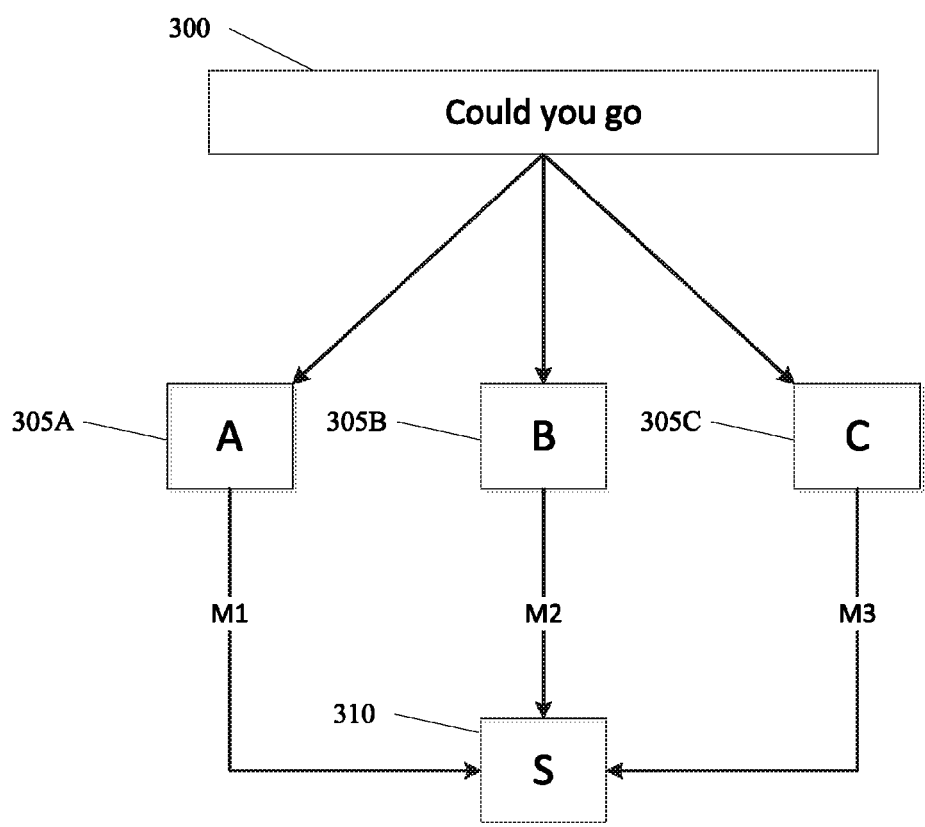
FIG. 3 is a diagram illustrating an example of providing a task indication to one or more scoring entities and determining a task association score for the task indication.

Referring to FIG. 3, a diagram illustrating an example of providing a task indication to one or more scoring entities and determining a task association score for the task indication is provided. In the illustrated diagram, task indication 300 includes the terms "Could you go." Task indication 300 may be determined from starting n-grams that were determined from one or more interrogative sentences in one or more messages, as described herein. The task indication 300 is provided to a measurement determination system 125 that is utilized by three entities (305A, 305B, and 305C) to provide task association measures. In some implementations, one or more of these entities may be individuals. In some implementations, the measurement determination system 125 may include one or more computing devices accessed by the individuals to view task indications and provide input related to the task indications and/or one or more computing devices that serve, to one or more other computing devices, task indications and an interface to provide input related to the task indications. In some implementations, one or more of the entities 305A, 305B, and 305C may be an application that may determine a measure that is indicative of likelihood that the task indication 300, "Could you go," is associated with one or more task requests.

Each of the entities 305A, 305B, and 305C may determine a task association measure and provide the task association measure to task indication processing engine 120. For example, entity 305A may determine a task association measure M1 and provide the task association measure M1 to task indication processing engine 120. Also, for example, entity 305B may independently determine a task association measure M2 and entity 305C may independently determine a task association measure M3. Measurement determination system 125 may provide the task association measures M1, M2, and M3 to task indication processing engine 120, which may utilize the task association measures to determine a task association score 310 that is based on M1, M2, and M3. The overall flow of FIG. 3 may be repeated for each of the task indications of a group of task indications to determine a task association score for each of the task indications of the group.

In some implementations, the task association score that is determined by task indication processing engine 120 for a task indication may be based on a weighting of one or more of the task association measures for the task indication. For example, measurement determination system 125 may provide task indication processing engine 120 three task association measures for a task indication and task indication processing engine 120 may determine a task association score by weighting the task association measures equally and/or by weighting one or more of the task association measures more heavily when determining the task association score. In some implementations, one or more of the received task association measures may be a binary measure and task indication processing engine 120 may determine a binary task association score that is based on, for example, the number of received task association measure that indicate a given task indication is associated with a task request, the frequency of positive task association measures, and/or the proportion of task association measures that are positive task association measures.

Various techniques may be utilized to determine task association score 310 and task association score may be a binary value, non-binary value, and/or other value. For example, task association score 310 may be a binary value such as a "yes/no" and/or "0/1". In some implementations, the binary value of task association score 310 may be based on binary values of M1, M2, and M3. For example, M1 may be a "1," M2 may be a "0," and M3 may be a "1," and task indication processing engine 120 may determine a binary task association score 130 of "1" based on "1" occurring more than "0" in the task association measures. In some implementations, a binary value of task association score 310 may be based on non-binary values of M1, M2, and M3, such as M1=0.50, M2=0.25, and M3=0.75. For example, task indication processing engine 120 may determine an average of task association measures M1, M2, and M3, and determine a binary value for task association score 310 based on an average of the task association measure satisfying a threshold, such as a value of "1" if the average is above 0.5 and a value of "0" if the average is below 0.5. In some implementations, task association score 310 may be a non-binary value (e.g., a value from 0 to 1 and/or one of: "high", "medium", "low") based on values of M1, M2, and M3. For example, task indication processing engine 120 may determine a task association score of 0.50 based on the average of non-binary measures of M1=0.50, M2=0.25, and M3=0.75. Also, for example, task indication processing engine 120 may determine a task association score of 0.67 based on the average of binary measures of M1=1, M2=1, and M3=0. In some implementations, M1, M2, and M3, may not be weighted equally. Additional and/or alternative techniques may be utilized to determine task association score 310 such as techniques that utilize averages, medians, and/or other values of task association measures, omit outliers of task association measures, etc.

Figure 4:
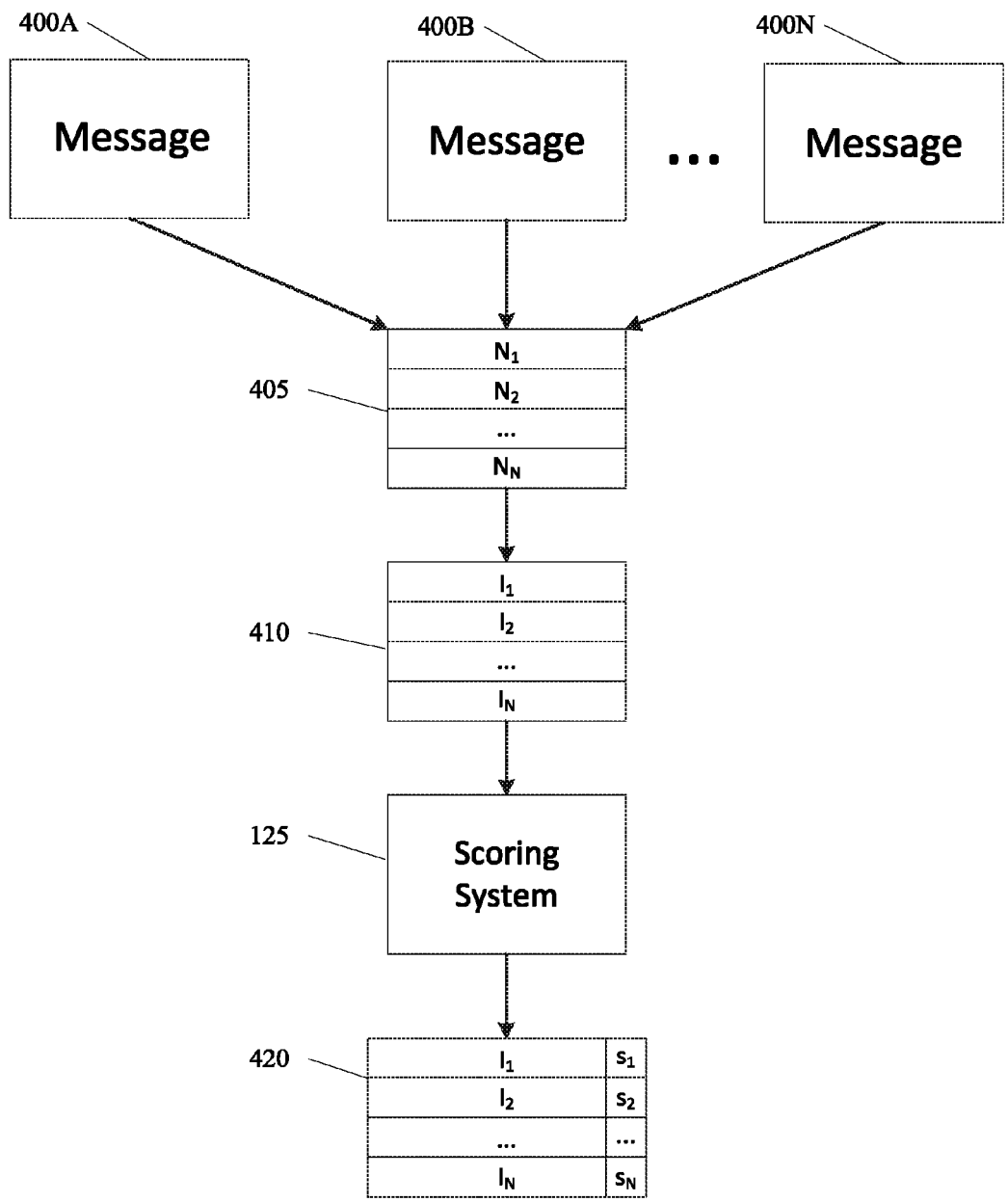
FIG. 4 is a diagram illustrating an example of determining task association scores for task indications.

Referring to FIG. 4, a diagram is provided illustrating an example of determining task association scores for task indications. In the illustrated diagram, messages 400A, 400B, through 400N are identified by natural language processing engine 115. One or more of the messages include one or more interrogative sentences and natural language processing engine 115 determines a set of starting n-grams 405 from the interrogative sentences. The starting n-grams 405 include n-grams $N_1$ through $N_N$ (more or fewer n-grams may be determined than messages). Based on the set of starting n-grams 405, task indication processing engine 120 determines a group of task indications 410 to provide to the measurement determination system 125. The task indications 410 include task indications $I_1$ through $I_N$ (fewer task indications may be determined than n-grams). As described herein, in some implementations the group of task indications 410 may be determined based on the count of starting n-grams 405 that conform to the task indications of the group of task indications 410. Task indication processing engine 120 provides the group of task indications 410 to the measurement determination system 125. Measurement determination system 125 may interface with one or more individuals and/or one or more applications that may determine, for each of the task indications of the group 410, one or more task association measures each indicative of likelihood that the task indication is indicative of a task request. Measurement determination system 125 may provide the one or more task association measures to task indication processing engine 120 and task indication processing engine 120 may determine a group 420 of task indications ($I_1$ through $I_N$) with associated scores ($S_1$ through $S_N$) that are determined based on the received task association measures.

In some implementations, task indication processing engine 120 may store one or more task indications in content database 130, optionally with associated task association scores. In some implementations, task indication processing engine 120 may store all of the task indications of the task indication group that was provided to measurement determination system 125. For example, referring to FIG. 4, task indication processing engine 120 may provide measurement determination system 125 with task indication group 410, determine scores for the task indications of the group, and store the scored task indications of the scored task indication group 420 in content database 130. In some implementations, task indication processing engine 120 may store the scored task indications of the scored task indication group 420 based on the associated task association scores satisfying a threshold. For example, task indication processing engine 120 may store $I_1$ of scored task indication group 420 if $S_1$ satisfies a threshold.

In some implementations, task indication processing engine 120 may store one or more task indications without associated task association scores. For example, in some implementations, task indication processing engine 120 may determine a subset of the task indications with corresponding task association scores that satisfy a threshold task association score indicative of a likely task request and store only that subset of task indications. For example, the threshold may be a set threshold (e.g., 0.8 for scores from 0 to 1 with 1 being most indicative of a task request) and/or may be based on other task association scores (e.g., a task association score that is more indicative of a task request than 70% of the other task association scores). The task indication processing engine 120 may store the subset of task indications as likely task indications in the content database 130.

Figure 5:
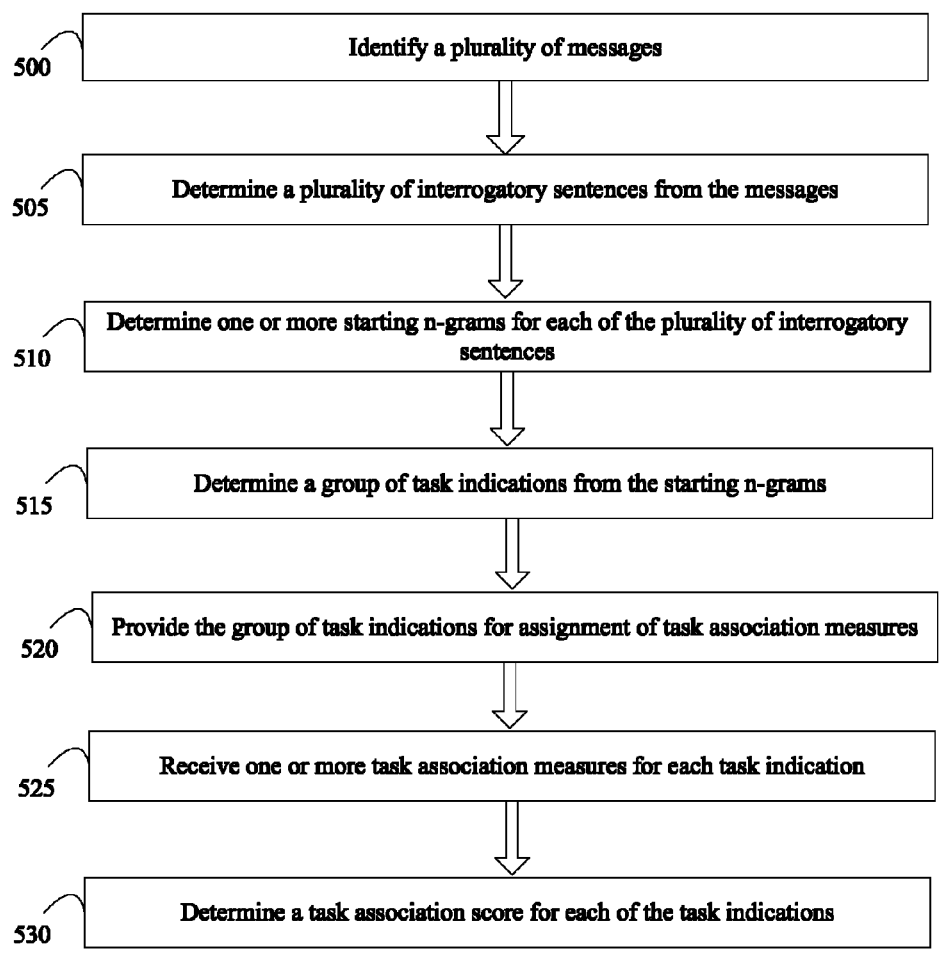
FIG. 5 is a flow chart illustrating an example method of determining task association scores for task indications based on starting n-grams in interrogative sentences.

Referring to FIG. 5, a flow chart is provided that illustrates an example method of determining task association scores for task indications based on starting n-grams in interrogative sentences. Other implementations may perform the steps in a different order, omit certain steps, and/or perform different and/or additional steps that those illustrated in FIG. 5. For convenience, aspects of FIG. 5 will be described with reference to one or more components of FIG. 1 that may perform the method such as the natural language processing engine 115 and/or the task indication processing engine 120.

At step 500, a plurality of messages is identified. In some implementations, the plurality of messages may be identified by a component that shares one or more characteristics with natural language processing engine 115. In some implementations, the message may be identified via content database 130. Identified messages may include, for example, emails, text messages, and/or instant messages. In some implementations, natural language processing engine 115 may identify, from a superset of messages, a subset group of messages to utilize for determining task indications. For example, natural language processing engine 115 may identify a group of messages and refine the group to exclude one or more of the messages based on, for example, the senders of the messages, the recipients of the messages, and/or other content of the messages.

At step 505, a plurality of interrogative sentences is determined from the plurality of messages. In some implementations, natural language processing engine 115 may identify interrogative sentences based on identifying sentences that end in a question mark. In some implementations, natural language processing engine 115 may additionally and/or alternatively identify interrogative sentences based on identifying one or more terms that are indicative of interrogative sentences, such as "Would" and "Could."

At step 510, one or more starting n-grams are determined for each of the plurality of interrogative sentences identified at step 505. In some implementations, a starting n-gram of an interrogative sentence may include one or more terms at the start of the interrogative sentence. For example, natural language processing engine 115 may determine a starting n-gram that includes the first four terms of an interrogative sentence. In some implementations, a starting n-gram of an interrogative sentence may be determined based on one or more identified terms in the interrogative sentence. For example, natural language processing engine 115 may determine a starting n-gram that includes one or more terms that occur in an interrogative sentence before the verb of the sentence. For example, all terms that occur before the verb of the sentence may be identified and/or all terms, up to n terms, that occur before the verb of the sentence may be identified.

At step 515, a group of task indications is determined from the starting n-grams determined at step 510. Each of the task indications of the group of task indications may be associated with a set of starting n-grams from multiple interrogative sentences. The group of the task indications may be determined based on a count of starting n-grams that conform to each task indication in the group. For example, task indication processing engine 120 may include only task indications in the group that have conforming starting n-grams that occur a threshold number of times in the starting n-grams and/or that occur a threshold frequency in the starting n-grams. For example, the n task indications that are associated with the greatest number of conforming starting n-grams may be included in the group of task indications. For example, the 500 task indications that are associated with the greatest number of conforming starting n-grams may be included in the group.

In some implementations, multiple starting n-grams may be utilized to determine a task indication based on similarity between the starting n-grams. In some implementations, task indication processing engine 120 may determine a task indication that is indicative of multiple occurrences of starting n-grams that are the same. For example, natural language processing engine 115 may determine one or more starting n-grams of "Could you please" and task indication processing engine 120 may determine that "Could you please" is a task indication based on the starting n-gram occurring multiple times in the set of interrogative sentences. In some implementations, a task indication may include one or more optional terms. For example, task indication processing engine 120 may determine a task indication of "[Please] Could you" with an optional term "Please" based on identifying starting n-grams of "Please could you," "Could you please," and "Could you."

At step 520, the group of task indications is provided for assignment of task association measures. The group of task indications may be provided to a system that provides the task indications to one or more individuals and/or applications to determine one or more task association measures for each of the task indications. Each task association measure is indicative of likelihood that a respective task indication is associated with one or more task requests. In some implementations the task indication processing engine 120 may provide the group of task indications to the measurement determination system 125. The measurement determination system 125 may include an interface to provide one or more entities with the task indications and the entities may assign one or more task association measures to each task indication. As described herein, in some implementations each task indication may be presented independent of other information of the interrogative sentences and/or messages from which n-grams corresponding to the task indication were determined.

At step 525, one or more task association measures are received for each of the task indications of the group of task indications. In some implementations, the task association measures are a binary measure, such as a "1" if the individual or application determined that the task indication is associated with a task request and a "0" if the individual or application determined that the task indication is not associated with a task request. In some implementations, an individual and/or application may determine a task association measure for a task indication that is a non-binary indication of the likelihood that the task indication is associated with a task request. For example, an individual or application may determine a value from 0 to 100 or a value such as "high", "medium", or "low" that is indicative of the likelihood that the task indication is associated with a task request.

At step 530, a task association score is determined for each of the task indications of the group of task indications. In some implementations, a task association score may be determined for a task indication based on multiple task association measures that were received for the task indication. For example, multiple individuals and/or applications may each independently determine a task association measure for a task indication and task indication processing engine 120 may determine a task association score for the task indication that is based on the multiple measures. In some implementations, task indication processing engine 120 may determine task association scores for task indications that are a binary value based on the task association measures. In some implementations, task indication processing engine 120 may determine task association scores for task indications that are non-binary values. For example, task indication processing engine 120 may determine a task association score for a task indication that is a value from 0 to 100 based on the received task association measures.

In some implementations, task indication processing engine 120 may store one or more task indications in content database 130, optionally with associated task association scores. In some implementations, task indication processing engine 120 may store all of the task indications of the task indication group that was provided to measurement determination system 125. In some implementations, task indication processing engine 120 may store the scored task indications of the scored task indication group 420 based on the associated task association scores satisfying a threshold. In some implementations, task indication processing engine 120 may store one or more task indications without associated task association scores. For example, in some implementations task indication processing engine 120 may determine a subset of the task indications with corresponding task association scores that satisfy a threshold task association score indicative of a likely task request. The task indication processing engine 120 may store the subset of task indications as likely task indications in the content database 130.

One or more of the determined task indications, and optionally the associated scores, may be utilized by task application 135 in determining one or more terms in a message that are indicative of a task request. For example, a set of one or more of the task indications having a task association score that satisfies a threshold may be utilized in determining a rules-based grammar that may be utilized by the task application 135 to determine all or parts of a message are indicative of a task request. Also, for example, a set of one or more of the task indications and associated scores may be utilized to train a classifier that may be utilized by the task application 135 to determine all or parts of a message are indicative of a task request. For example, task indications having associated scores that satisfy a first threshold indicative of a likely task request may be utilized as positive training examples for a classifier and/or task indications having associated scores that fail to satisfy a second threshold indicative of an unlikely task request may be utilized as negative training examples for the classifier.

Task application 135 may utilize the rules-based grammar and/or the classifier to determine likelihood that a message and/or a segment of a message (e.g., a sentence) is indicative of a task request. When task application 135 determines a message and/or segment of a message likely indicates a task request, task application 135 may flag all or parts of the message to indicate a potential task request and/or may otherwise provide a notification that the message includes a potential task request. For example, task application 135 may highlight the segment of the message that is determined to be indicative of a task request. Also, for example, task application 135 may populate information related to the task request in a task listing of the user, a calendar of the user, and/or otherwise provide a notification that the message includes a potential task request. In implementations in which a non-binary likelihood that a message and/or a segment of a message is indicative of a task request is determined, the type of notification provided to the user may be dependent on the likelihood. For example, information related to the task may only be automatically populated in a task listing or calendar of the user when the likelihood satisfies a threshold.

As described herein, in some implementations task application 135 may utilize a set of one or more of the task indications that were determined by task indication processing engine 120 as part of a rules-based grammar to identify one or more terms in a message that conform to a task indication. For example, task application 135 may identify previously determined task indications via content database 130 that have a task association score that satisfies a threshold that is indicative of a likely task request. The task application 135 may determine if one or more terms and/or n-grams in a message conform to one or more of the identified task indications. For example, task application 135 may identify a message of a user, identify the n-gram "Could you go to the store?" in the message, and identify a previously determined task indication of "Could you go" has a task association score indicative of a likely task request. Task application 135 may identify that the task indication "Could you go" is included in the n-gram "Could you go to the store?" and determine, based on the n-gram including the terms of the task indication, that the n-gram "Could you go to the store?" may be associated with a task request.

In some implementations, additional and/or alternative factors may be utilized in determining whether an n-gram in a message is a potential task request. For example, one or more task indications may be utilized as part of a rule in a rules-based grammar and other factors may be utilized as other parts of the rule. For example, other factors may include requiring that a task indication be present in a starting n-gram of a sentence. For example, a rule may require that the task indication occur in the first n terms of a sentence, occur before a verb in a sentence, and/or occur within (before and/or after) n terms of the verb in the sentence. Also, for example, other factors may include requiring that the task indication be present in an interrogative sentence. For example, a rule may require that the task indication occur in a sentence ending in a question mark and/or in a sentence that is otherwise identified as an interrogative sentence. Also, for example, other factors may include requiring that the sentence in which the task indication occurs has one or more other terms meeting certain criteria. For example, a rule may require that the sentence in which the task indication occurs includes a reference to a person (e.g., "Bob", "you") and/or a place (e.g., "Store", "Restaurant 1"), and/or include "please" before and/or after the task indication. Also, for example, other factors may include allowing the presence of adverbial clauses, purpose clauses, and/or vocatives in the introduction and/or the outroduction of a sentence.

In some implementations, task application 135 may determine whether one or more terms and/or an n-gram in a message is associated with a task request based on a set of one or more of the task indications and based on the task association scores that are associated with the task indications. For example, one or more rules of a rules-based grammar may include rules related to the task association scores of task indications. For example, task application 135 may identify a segment of a message of a user that includes an n-gram that conforms to an identified task indication.

Task application 135 may further identify a score for the task indication and determine whether the segment indicates a task request based on the score of the task indication. For example, task application 135 may determine that a segment may be associated with a task request only when the n-gram conforms to a task indication having a task association score that satisfies a threshold (e.g., the task indication is indicative of a task request). Also, for example, task application 135 may determine that a segment is not associated with a task request when the n-gram conforms to a task indication having a task association score that fails to satisfy a threshold (e.g., the task indication is not indicative of a task request). Also, for example, the task association score may be utilized as a factor in a rules-based grammar. For example, presence of a task indication having a task association score highly indicative of a task request may be more likely to indicate a task request based on a rule than presence of a task indication having a task association score that is poorly indicative of a task request. For example, a rule may include: identifying a segment as a task request if the segment includes a task indication having a score that satisfies a first threshold; if the segment does not include a task indication having a score that satisfies the first threshold, but includes a task indication having a score that satisfies a second threshold (less indicative of a task request than the first threshold), then only identifying the segment as a task request if the segment includes one or more other indications of a task (e.g., ends in a question mark, includes a vocative, and/or includes "please" before the task indication).

In some implementations, task application 135 may utilize all or parts of a segment of a message identified as indicating a task request and/or one or more other parts of the message to create a task for a user that received the message and/or otherwise provide a notification to the user that the message and/or the segment potentially pertains to a task request. For example, task application 135 may identify the sentence "Could you go to the store?" in a message and additionally determine that the sentence includes a task indication of "Could you go." Task application 135 may determine that a score that is associated with the task indication "Could you go" and/or a score that is determined based on utilizing "Could you go" in a rules-based grammar analysis is indicative of the sentence "Could you go to the store?" being a task request. Task application 135 determine a task based on one or more terms from the sentence, such as determining a task of "Travel to store" based on the terms "go to the store" in the sentence that has been determined as associated with a task request. Task application 135 may provide the user with a suggestion to create a task of "Travel to store," provide a calendar application of the user with a calendar entry "Travel to store," and/or create a task that may be utilized to provide the user with a reminder to "Travel to the store." Also, for example, task application may provide the user with an indication that the message and/or sentence may include a task request. For example, the sentence and/or the message may be highlighted, underlined, bolded, starred, and/or otherwise provided with an indication that the sentence and/or the message may pertain to a task request.

In some implementations, task indications and, optionally, task association scores of task indications may be utilized with additional or alternative techniques to determine task requests in messages, such as the classifier technique described herein. For example, one or more task indications may be utilized, alone or in conjunction with other input, to train a classifier to identify sentences that likely include a task request. The task application 135 may utilize the classifier to determine whether one or more segments of a message potentially pertain to a task request. For example, starting n-grams and/or other parts of a sentence may be provided to the classifier as input and the output of the classifier may indicate likelihood that the sentence indicates a task request.

Figure 6:
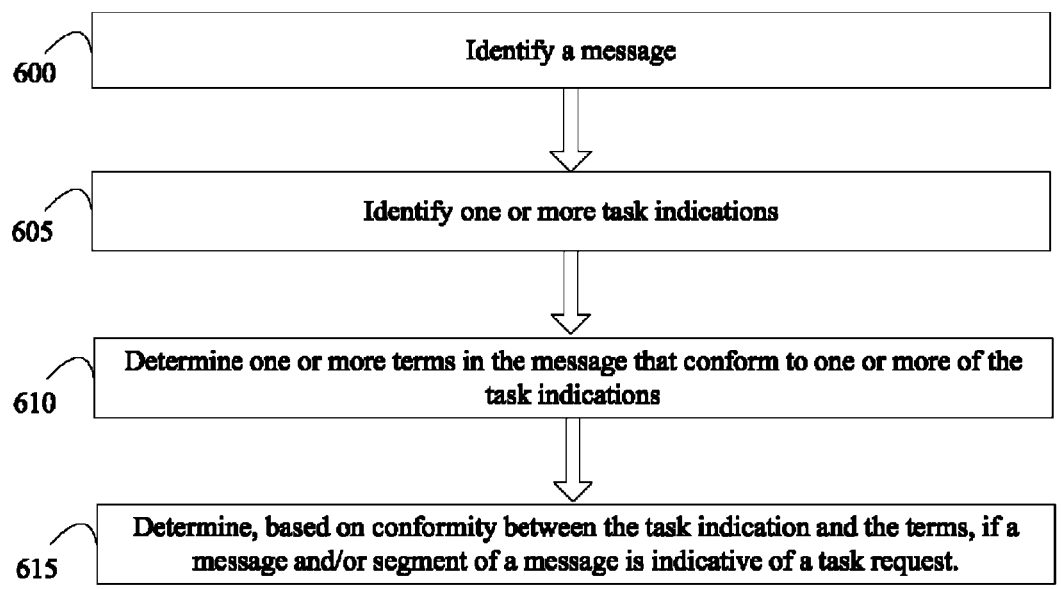
FIG. 6 is a flow chart illustrating an example method of determining a task request in a message based on one or more n-grams of the message and one or more determined task indications.

Referring to FIG. 6, a flow chart is provided illustrating an example method of determining a task request in a message based on one or more n-grams of the message and one or more determined task indications. Other implementations may perform the steps in a different order, omit certain steps, and/or perform different and/or additional steps that those illustrated in FIG. 6. For convenience, aspects of FIG. 6 will be described with reference to one or more components of FIG. 1 that may perform the method such as task application 135.

At step 600, a message is identified by task application 135. The message may be associated with a user and may include messages sent by the user, received by the user, and/or messages composed by the user. In some implementations, the messages may include one or more recipients. For example, a user may send a message to multiple recipients and/or a user may receive a message that was additionally sent to multiple recipients.

At step 605, one or more task indications are identified. The task indications may include one or more of the task indications that were determined by task indication processing engine 120 via a method that shares one or more characteristics with the method that is described with respect to FIG. 5. In some implementations, task application 135 may identify the task indication from a database that shares one or more characteristics with content database 130. In some implementations, task application 135 may additionally identify task association scores that are associated with one or more of the task indications in content database 130. In some implementations, the one or more identified task indications may be included in and/or referenced by a rule of a rules-based grammar as described herein.

At step 610, one or more terms in the message that conform to one or more of the task indications are determined. In some implementations, task application 135 may utilize the one or more task indications that were identified via content database 130 to determine whether one or more terms in the message share similarities with one or more terms of the message. For example, task application 135 may identify a task indication of "Could you" and identify one or more sentences in the message that begin and/or include the terms "Could you."

At step 615, it is determined, based on conformity between the task indication and the terms, if a message and/or a segment of a message (e.g., a sentence including the terms of step 610) is indicative of a task request. For example, task application 135 may identify a message of a user, identify the n-gram "Could you go to the store?" in the message, and identify a previously determined task indication of "Could you go" has a task indication score indicative of a likely task request. Task application 135 may identify that the task indication "Could you go" is included in the n-gram "Could you go to the store?" and determine, based on the n-gram including the terms of the task indication, that the n-gram "Could you go to the store?" may be associated with a task request.

In some implementations, additional and/or alternative factors may be utilized in determining whether an n-gram in a message is a potential task request. For example, one or more task indications may be utilized as part of a rule in a rules-based grammar and other factors may be utilized as other parts of the rule. For example, other factors may include requiring that a task indication be present in a starting n-gram of a sentence. Also, for example, other factors may include requiring that the task indication be present in an interrogative sentence. Also, for example, other factors may include requiring that the sentence in which the task indication occurs has one or more other terms meeting certain criteria. Also, for example, other factors may include allowing the presence of adverbial clauses, purpose clauses, and/or vocatives in the introduction and/or the outroduction of a sentence When task application 135 determines a message and/or segment of a message likely indicates a task request, task application 135 may flag all or parts of the message to indicate a potential task request and/or may otherwise provide a notification that the message includes a potential task request. For example, task application 135 may highlight the segment of the message that is determined to be indicative of a task request. Also, for example, task application 135 may populate information related to the task request in a task listing of the user, a calendar of the user, and/or otherwise provide a notification that the message includes a potential task request. In implementations in which a non-binary likelihood that a message and/or a segment of a message is indicative of a task request is determined, the type of notification provided to the user may be dependent on the likelihood. For example, information related to the task may only be automatically populated in a task listing or calendar of the user when the likelihood satisfies a threshold.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to identify starting n-grams in one or more interrogative sentences, determine task indications based on the starting n-grams, and/or determine a task association score for each of the determined task indications based on assigned task association measures. These software modules are generally executed by processor 714 alone or in combination with other processors. Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method performed by one or more processors based on instructions stored in memory, comprising:
   identifying, by one or more of the processors based on the instructions stored in the memory, a plurality of messages from one or more databases;
   determining, by one or more of the processors based on the instructions stored in the memory, a plurality of interrogative sentences from the messages;
   determining, by one or more of the processors based on the instructions stored in the memory, starting n-grams from the interrogative sentences;
   determining, by one or more of the processors based on the instructions stored in the memory, a group of task indications, wherein each of the task indications of the group is based on a set of one or more of the starting n-grams, and wherein determining to include a given task indication of the task indications in the group is based on a count of the starting n-grams that conform to the given task indication;
   providing, by one or more of the processors based on the instructions stored in the memory, the group of the task indications;
   receiving, by one or more of the processors based on the instructions stored in the memory and in response to providing the group of the task indications, one or more task association measures for each of the task indications of the group, wherein a given task association measure for a given task indication is indicative of likelihood that the given task indication is associated with a task request;
   determining, by one or more of the processors based on the instructions stored in the memory, a task association score for each of the task indications of the group, wherein the task association score for the given task indication is based on the one or more task association measures received for the given task indication; and
   storing, by one or more of the processors based on the instructions stored in the memory, the task association score for each of a plurality of the task indications of the group.

2. The method of claim 1, where providing the group of the task indications includes providing the group of the task indications, independent of other information of the interrogative sentences, to one or more computing devices for assignment of the task association measures by one or more individuals.

3. The method of claim 1, wherein determining the starting n-gram for a given interrogative sentence of the interrogative sentences includes identifying a verb in the given interrogative sentence and determining the starting n-gram based on one or more n-grams that occur before the verb in the given interrogative sentence.

4. The method of claim 3, wherein the starting n-gram for the given interrogative sentence includes the verb and one or more of the n-grams that occur before the verb in the given interrogative sentence.

5. The method of claim 1, wherein determining the plurality of interrogative sentences includes determining the interrogative sentences based on at least one n-gram of the interrogative sentences, wherein the at least one n-gram is indicative of an interrogative sentence.

6. The method of claim 5, wherein the at least one n-gram includes a punctuation mark.

7. The method of claim 6, wherein the punctuation mark is a question mark.

8. The method of claim 1, wherein each of the task association measures is a binary value.

9. The method of claim 1, further comprising:
   associating, in a database, one or more of the task indications with a corresponding said task association score.

10. The method of claim 1, further including:
determining the task association score for the given task indication satisfies a threshold task association score indicative of a likely task request; and
storing, in a database, the given task indication as a likely task indication based on determining the task association score for the given task indication satisfies the threshold task association score.

11. The method of claim 1, further comprising:
determining a subset of the task indications with corresponding said task association scores that satisfy a threshold task association score indicative of a likely task request; and
storing the subset of the task indications as likely task indications.

12. The method of claim 11, wherein storing the subset of the task indications as likely task indications includes storing, in a database, each of the task indications of the subset and associated said task association scores.

13. The method of claim 1, wherein identifying the plurality of messages includes identifying the messages based on senders of the messages.

14. The method of claim 13, wherein identifying the plurality of messages based on the senders includes restricting the messages to those indicated as having a sender who is an individual.

15. The method of claim 1, wherein identifying the plurality of messages includes identifying the messages based on recipients of the messages.

16. The method of claim 1, wherein each of the starting n-grams is only a portion of a respective one of the interrogative sentences.

17. A system including memory and one or more processors operable to execute instructions stored in memory, comprising instructions to:
identify a plurality of messages from one or more databases;
determine a plurality of interrogative sentences from the messages;
determine starting n-grams from the interrogative sentences;
determine a group of task indications, wherein each of the task indications of the group is based on a set of one or more of the starting n-grams, and wherein determining to include a given task indication of the task indications in the group is based on a count of the starting n-grams that conform to the given task indication;
provide the group of the task indications;
receive, in response to providing the group of the task indications, one or more task association measures for each of the task indications of the group, wherein a given task association measure for a given task indication is indicative of likelihood that the given task indication is associated with a task request;
determine a task association score for each of the task indications of the group, wherein the task association score for the given task indication is based on the one or more task association measures received for the given task indication; and
store the task association score for each of a plurality of the task indications of the group.

18. The system of claim 17, where the instructions to provide the group of the task indications includes instructions to provide the group of the task indications, independent of other information of the interrogative sentences, to one or more computing devices for assignment of the task association measures by one or more individuals.

19. The system of claim 17, wherein the instructions to determine the plurality of interrogative sentences includes instructions to determine the interrogative sentences based on at least one n-gram of the interrogative sentences, wherein the at least one n-gram is indicative of an interrogative sentence.

20. The system of claim 17, wherein the instructions to identify the plurality of messages includes instructions to identify the messages based on senders of the messages.

21. The system of claim 20, wherein the instructions to identify the plurality of messages based on the senders includes instructions to restrict the messages to those indicated as having a sender who is an individual.

22. The system of claim 17, wherein the instructions to identify the plurality of messages includes instructions to identify the messages based on recipients of the messages.

23. A non-transitory computer readable storage medium storing at least one program configured for execution by at least one processor of a computer system, the at least one program comprising instructions to:
identify a plurality of messages from one or more databases;
determine a plurality of interrogative sentences from the messages;
determine starting n-grams from the interrogative sentences;
determine a group of task indications, wherein each of the task indications of the group is based on a set of one or more of the starting n-grams, and wherein determining to include a given task indication of the task indications in the group is based on a count of the starting n-grams that conform to the given task indication;
provide the group of the task indications;
receive, in response to providing the group of the task indications, one or more task association measures for each of the task indications of the group, wherein a given task association measure for a given task indication is indicative of likelihood that the given task indication is associated with a task request;
determine a task association score for each of the task indications of the group, wherein the task association score for the given task indication is based on the one or more task association measures received for the given task indication; and
store the task association score for each of a plurality of the task indications of the group.

* * * * *